(12) United States Patent
O'Brien (10) Patent No.: US 10,760,650 B2
(45) Date of Patent: Sep. 1, 2020

(54) GEAR MECHANISM PROVIDING PASSIVE RATIO SWITCHING

(71) Applicant: Cummins Inc., Columbus, IN (US)

(72) Inventor: John P. O'Brien, Columbus, IN (US)

(73) Assignee: Cummins Inc., Columbus, IN (US)

( * ) Notice: Subject to any disclaimer, the term of this patent is extended or adjusted under 35 U.S.C. 154(b) by 990 days.

(21) Appl. No.: 15/273,111

(22) Filed: Sep. 22, 2016

(65) Prior Publication Data

US 2017/0089426 A1 Mar. 30, 2017

Related U.S. Application Data (60) Provisional application No. 62/222,991, filed on Sep. 24, 2015.

(51) Int. Cl.
| | | |
|---|---|---|
| *F16H 3/00* | (2006.01) | |
| *F02N 11/08* | (2006.01) | |
| *F02N 15/02* | (2006.01) | |
| *F02N 11/04* | (2006.01) | |
| *B60K 6/383* | (2007.10) | |

(52) U.S. Cl.
CPC ......... *F16H 3/003* (2013.01); *F02N 11/0851* (2013.01); *B60K 6/383* (2013.01); *F02N 11/04* (2013.01); *F02N 15/022* (2013.01); *F16H 3/00* (2013.01)

(58) Field of Classification Search
CPC . F16H 3/006; F16H 3/10; F16H 3/089; B60K 6/383
USPC .................................. 74/331, 661; 903/913
See application file for complete search history.

(56) References Cited

U.S. PATENT DOCUMENTS

| | | | | |
|---|---|---|---|---|
| 5,549,524 | A * | 8/1996 | Yang | B60K 6/38 477/3 |
| 7,017,697 | B2 * | 3/2006 | Yang | B62M 7/00 180/230 |
| 8,371,975 | B2 | 2/2013 | Seo et al. | |
| 8,417,431 | B2 | 4/2013 | Okubo et al. | |
| 8,449,420 | B2 | 5/2013 | Seo et al. | |
| 8,590,425 | B2 * | 11/2013 | Pesola | B60K 6/48 74/330 |
| 2012/0031229 | A1 * | 2/2012 | Venturi | B60K 6/383 74/665 A |
| 2013/0085029 | A1 * | 4/2013 | Ono | B60K 6/365 475/5 |
| 2017/0190246 | A1 * | 7/2017 | Venturi | B60K 6/383 |
| 2017/0246944 | A1 * | 8/2017 | Goleski | B60K 6/36 |
| 2019/0162272 | A1 * | 5/2019 | Eo | F16H 3/089 |

FOREIGN PATENT DOCUMENTS

| | | |
|---|---|---|
| JP | 2012-240623 | * 12/2012 |
| WO | WO-2007/116220 | 10/2007 |

* cited by examiner

*Primary Examiner* — William C Joyce (74) *Attorney, Agent, or Firm* — Foley & Lardner LLP (57) ABSTRACT

A gearbox includes a first shaft operatively coupled to an output of an engine, with the first shaft having a first longitudinal axis. A second shaft is operatively coupled to a driveshaft of an electric machine, the second shaft having a second longitudinal axis. The second longitudinal axis is non-coaxial with the first longitudinal axis. A geartrain operatively couples the first and second shafts. The geartrain is structured to passively switch between a first gear ratio and a different second gear ratio.

23 Claims, 4 Drawing Sheets

GEAR MECHANISM PROVIDING PASSIVE RATIO SWITCHING

CROSS-REFERENCE TO RELATED PATENT APPLICATIONS

This application claims the benefit of and priority to U.S. Provisional Patent Application 62/222,991 filed Sep. 24, 2015 to O'Brien, titled "Gear Mechanism Providing Passive Ratio Switching," the contents of which are incorporated herein by reference in their entirety.

TECHNICAL FIELD

The present disclosure relates generally to the field of gearbox systems.

BACKGROUND

Internal combustion engine systems conventionally include a starting system to start the engine and a generator system to charge the battery and power the electrical system once the engine is running. In conventional starting systems, an electric starter motor is mounted to the engine and includes a drive pinion that, in operation (e.g., by activating a key-operated switch), meshes with a ring gear on a flywheel of the engine. The drive pinion on the starter motor rotates the flywheel so as to initiate the engine's operation. In some systems, an overrunning or freewheel clutch is installed between the starter output shaft and the drive pinion. The overrunning clutch is configured to disengage the connection between the starter output shaft and the drive pinion as soon as the flywheel of the engine is turning faster than the drive pinion of the starter motor. In order to generate sufficient torque to turn the flywheel, starting systems utilize a high gear ratio (e.g., 10:1-20:1) between the engine and the starter motor.

As noted above, internal combustion engine systems also conventionally include a generator system to charge the battery and power the electrical system once the engine is running. In conventional generator systems, a crankshaft pulley is coupled to the crankshaft of the engine. A belt is coupled to the crankshaft pulley and to one or more accessories, including an alternator or generator. The alternator is configured to convert mechanical energy received via the belt to electrical energy. The electrical energy may be transferred to a battery to power the electrical system of the vehicle. Generator systems conventionally utilize a gear ratio of approximately 2:1-5:1 between the alternator and the engine. Accordingly, the gear ratio utilized in generator systems is lower than the gear ratio utilized in starting systems.

SUMMARY

Various embodiments relate to gearboxes that provide passive gear switching. An example gearbox includes a first shaft having a first longitudinal axis, with the first shaft operatively coupled to an output of an engine. A second shaft has a second longitudinal axis and is operatively coupled to a driveshaft of an electric machine. The second longitudinal axis of the second shaft is non-coaxial with the first longitudinal axis of the first shaft. A geartrain operatively couples the first and second shafts. The geartrain is structured to passively switch between a first gear ratio and a different second gear ratio.

Various other embodiments relate to a system including an electric machine and a gearbox. The electric machine includes a driveshaft. The electric machine is structured to selectively operate in a starting mode and a generating mode. The starting mode includes providing energy, and the generating mode includes receiving energy. The gearbox includes a first shaft having a first longitudinal axis. A second shaft is operatively coupled to the driveshaft of the electric machine. The second shaft has a second longitudinal axis. The second longitudinal axis is non-coaxial with the first longitudinal axis. A geartrain operatively couples the first and second shafts. The geartrain is structured to passively switch between a first gear ratio and a different second gear ratio.

Various other embodiments relate to a system including an electric machine and a gearbox. The electric machine includes a driveshaft. The electric machine is structured to selectively operate in a starting mode and a generating mode. The starting mode includes providing energy, and the generating mode includes receiving energy. The gearbox includes a first shaft having a first longitudinal axis. A second shaft is operatively coupled to the driveshaft of the electric machine. The second shaft has a second longitudinal axis. The second longitudinal axis is non-coaxial with the first longitudinal axis. A first geartrain includes a first gear rigidly coupled to the first shaft. A second gear is in meshed engagement with the first gear. A third gear is in meshed engagement with the second gear. A second geartrain includes a fourth gear. A fifth gear is in meshed engagement with the fourth gear. A sixth gear is in meshed engagement with the fifth gear. The sixth gear is rigidly coupled to the second shaft. A first clutch selectively couples the third and fourth gears. A second clutch selectively couples the second and fifth gears or the second and sixth gears.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Instead of utilizing a discrete starter motor and alternator, some vehicle systems include an electrical machine that performs the functions of both the starter motor and the alternator, namely, starting the engine and generating power for the electrical system. In addition, the electrical machine may be configured to convert the vehicle's kinetic energy into electrical energy through regenerative braking, and may also be configured to operate as an extra source of motive power, using stored electrical energy to enhance engine output. Such electrical machines may be referred to as motor-generator units (MGUs), integrated starter-generators (ISG), or belt-driven starter-generators (BSGs), for example. For convenience, MGUs are discussed by way of example herein; however, the concepts described apply also to other electrical machines such as ISGs, BSGs, other starter motors, or other converters between electrical and mechanical energy, where the converter receives energy in a first mode (receives mechanical energy or electrical energy) and provides energy in a second mode (provides electrical energy or mechanical energy, respectively).

Conventionally, MGUs include a single drive shaft operatively coupled to a gearbox. The gearbox may be operatively coupled to an engine output (e.g., crankshaft). Depending on the operating mode, the MGU may be driven by, or may drive, the engine. For example, in starting mode, the MGU may drive (e.g., transfer or provide energy to) the engine. Alternatively, in generating mode, the engine may drive (e.g., transfer or provide energy to) the MGU. As mentioned above, a lower gear ratio is used during the generating mode compared to the starting mode. Accordingly, the gearbox selectively operates using one of two gear ratios, depending on the operating mode and in accordance with various embodiments.

Gearbox systems may include various types of gear configurations. For example, one example gear configuration is a planetary or epicyclic gear system. In planetary gear systems, one or more outer gears, or planet gears, revolve about a central, or sun gear. Typically, the planet gears are mounted on a movable carrier, and the planet gears mesh with an outer ring gear. In some configurations, a planetary gear set may include two sun gears and one series of planet pinions associated with each sun gear. One of the sun gears is selectively engageable to the other sun gear, depending on the direction of torque input. When the sun gears are engaged, the gearbox operates using a first gear ratio, and when the sun gears are disengaged, the gearbox operates using a different second gear ratio.

In some implementations, however, it may be desirable to implement gear configurations other than planetary or epicyclic gear configurations. One limitation to planetary gear configurations is that each of the sun gear, the planet carrier, and the ring gear must be coaxial. Accordingly, the MGU and the gearbox are each constrained to a single mounting configuration relative to the input (e.g., the crankshaft). This can present packaging difficulties and/or drive additional cost. For example, adjacent vehicle components may impinge the space in which the MGU and/or the gearbox must be mounted. Therefore, costly redesigns may be required to implement the MGU and the gearbox in certain vehicle systems or, in some cases, it may not be possible to implement the MGU and the gearbox. In addition, the internal gear of the ring gear requires a unique gear tooth machining process. This can present additional manufacturing or sourcing requirements, thereby adding cost and complexity to the manufacturing process.

Various embodiments relate to a gearbox for transmitting power from an engine to an electric machine. The gearbox includes a geartrain structured to transmit torque from the engine to the electric machine at a first gear ratio and to transmit torque from the electric machine to the engine at a different second gear ratio. The geartrain may include two overrunning clutches to passively switch between the first and second gear ratios, depending on the direction of torque input. In various embodiments, the gear train does not include a planetary gear configuration. In one embodiment, the gear train includes a planar gear configuration. In some embodiments, the term "planar gear configuration" refers to a gear train in which input torque is provided to the gear train along a first axis and output torque is provided by the gear train along a different second axis. This is in contrast to conventional planetary gear configurations in which input and output torque is provided along a common axis. In some embodiments, the term "planar gear configuration" refers to a gear train in which all of the gears of the gear train are disposed on a common plane normal to the rotational axes of the gears. By utilizing planar gear configurations, a longitudinal axis of a first shaft operatively coupled to the driveshaft of the engine need not be coaxial with a second longitudinal axis of a second shaft operatively coupled to a driveshaft of the electric machine. Accordingly, the electric machine is selectively mountable to the gearbox at a plurality of mounting locations.

As used herein, the terms "passive gear switching" and "passive gear ratio switching" refers to engaging and/or disengaging gears without use of a separate actuation mechanism (e.g., an electronic, hydraulic, manual, etc. actuator or gear selector). As will be appreciated, passive gear switching may involve engaging and/or disengaging gears, thereby employing different gear ratios, depending on the direction or relative speed of the torque input to the gears, or in other ways. For example, in one embodiment, the gearbox enables passive gear switching by use of self-actuating, one-way clutches. The self-actuating, one-way clutches are configured to engage or disengage depending on the direction of the torque input. The clutches operate to selectively engage gear trains having different gear ratios. Accordingly, in one embodiment, a first clutch is engaged and a second clutch is disengaged when the MGU provides torque in a first direction, thereby providing a first gear ratio. The first clutch is disengaged and the second clutch is engaged when the MGU provides torque in an opposite second direction, thereby providing a second gear ratio. The gearbox may also enable passive gear switching by use of overrunning clutches. The overrunning clutches are configured to disengage a driving shaft from a driven shaft when the driven shaft rotates faster than the driving shaft. Accordingly, different gear ratios may be utilized depending on the relative speed of the driving shaft and the driven shaft. Other embodiments may enable passive gear switching in other ways.

Figure 1:
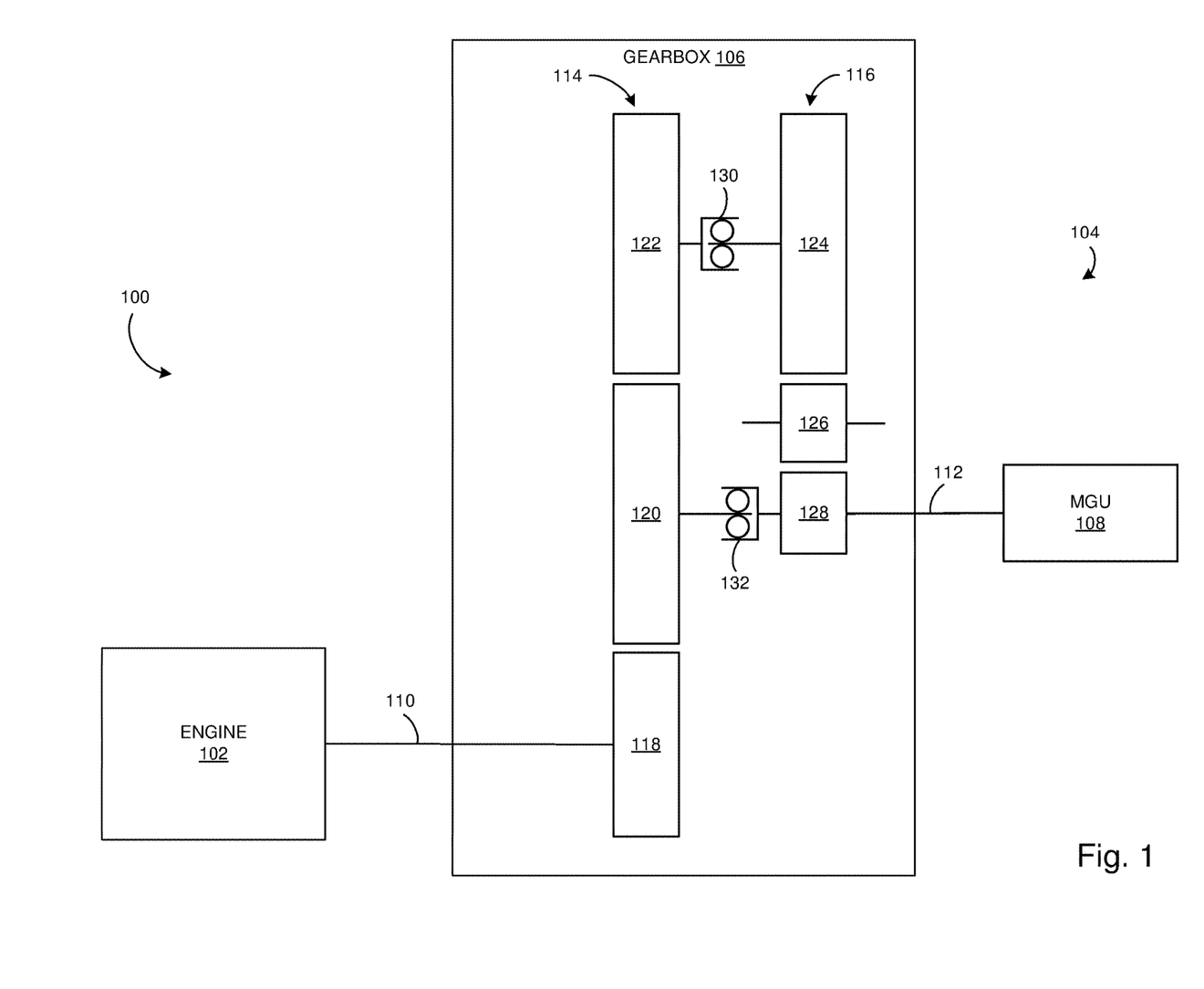
FIG. 1 is a schematic diagram of a vehicle powertrain system, according to an embodiment.

FIG. 1 is a schematic diagram of a vehicle powertrain system 100, according to an embodiment. More specifically, the vehicle powertrain system 100 of FIG. 1 includes an engine 102 operatively coupled to an integrated starting/generating system 104. Although not shown in FIG. 1, the vehicle powertrain system 100 may also include a transmission, drive shafts, differential, final drive, etc. As shown in FIG. 1, the integrated starting/generating system 104 includes a gearbox 106 and an MGU 108. The MGU 108 may be any electrical machine that is capable of both converting electrical energy to mechanical energy, and converting mechanical energy to electrical energy. In other words, the MGU 108 may be configured to operate both as a starter motor and as an alternator. Although referred to as an MGU, the MGU 108 may also be an ISG, a BSG, or another type of electrical machine.

The gearbox 106 includes a first shaft 110 operatively coupling the gearbox 106 and an output of the engine 102. The first shaft 110 is configured to transfer torque between the engine 102 and the gearbox 106. In one embodiment, the first shaft 110 may be the crankshaft of the engine 102. In other embodiments, the first shaft 110 may be directly or indirectly coupled to the output (e.g., crankshaft) of the engine 102. For example, the first shaft 110 may be an output shaft of the transmission, which is driven by the engine 102. In another embodiment, the first shaft 110 may be operatively coupled to the output of the engine 102 via a belt and pulley system.

The gearbox 106 also includes a second shaft 112 operatively coupling the gearbox 106 and the MGU 108. The second shaft 112 is configured to transfer torque between the gearbox 106 and the MGU 108. In one embodiment, the second shaft 112 may be an output shaft of the MGU 108. In other embodiments, the second shaft 112 may be directly or indirectly coupled to the output of the MGU 108. In another embodiment, the second shaft 112 may be operatively coupled to the output of the MGU 108 via a belt and pulley system.

As illustrated in FIG. 1, the gearbox 106 includes first and second gear trains 114, 116. Each of the first and second gear trains 114, 116 includes a plurality of gears in operative (e.g., meshed or torque transferring) engagement. More specifically, as indicated in FIG. 1, the first gear train 114 includes first, second, and third gears 118, 120, 122, respectively, in operative engagement with each other. The first shaft 110 is operatively (e.g., rigidly) coupled to the first gear 118, such that the first gear 118 rotates in sync with the first shaft 110. Accordingly, the first gear train 114 is in operative (e.g., torque transferring) engagement with the engine 102 via the first shaft 110 coupled to the first gear 118.

The second gear train 116 includes fourth, fifth, and sixth gears 124, 126, 128, respectively, in operative engagement with each other. The second shaft 112 is operatively (e.g., rigidly) coupled to the sixth gear 128, such that the sixth gear 128 rotates in sync with the second shaft 112. Accordingly, the second gear train 116 is in operative (e.g., torque transferring) engagement with the MGU 108 via the second shaft 112 coupled to the sixth gear 128. The first, second, third, fourth, fifth and sixth gears 118, 120, 122, 124, 126, 128 may be any of various sizes so as to provide any of various gear ratios therebetween. For example, in one embodiment, the second gear 120 and the sixth gear 128 operate with at least a 3:1 gear ratio. In one embodiment, the third gear 122 and the fourth gear 124 operate at no higher than a 1:1 gear ratio.

The first gear train 114 is selectively coupled to the second gear train 116 via first and second clutches 130, 132. More specifically, the first clutch 130 selectively couples the third gear 122 of the first gear train 114 to the fourth gear 124 of the second gear train 116. The second clutch 132 selectively couples the second gear 120 of the first gear train 114 to the sixth gear 128 of the second gear train 116. According to various embodiments, the first and second clutches 130, 132 are passive clutches, meaning that they may be self-actuated (e.g., mechanically engaged and disengaged without use of an external actuator). However, in some embodiments, the first and second clutches 130, 132 may be engaged by use of an external actuator, such as a hydraulic or electric actuator.

According to an embodiment, the first and second clutches 130, 132 are one-way overrunning clutches (e.g., freewheel, sprag, roller and ramp, ratchet, etc.). The first and second clutches 130, 132 operate with two primary operating characteristics. In a first aspect, the first and second clutches 130, 132 are one-way clutches, meaning that they are configured to rotate freely (free-wheel or disengage) when rotated in a first direction, and engage (lock) when rotated in an opposite second direction. Therefore, the first and second clutches 130, 132 are configured to transmit torque only when rotated in a single direction. In a second aspect, the first and second clutches 130, 132 are overrunning clutches, meaning that they are configured to disengage a driving shaft from a driven shaft when the driven shaft rotates faster than the driving shaft. For example, when the MGU 108 is operating in a starting mode, one or both of the first and second clutches 130, 132 may be configured to transmit torque from the MGU 108 to the engine 102 to start the engine, but may automatically disengage once the engine 102 has started, thereby preventing the MGU 108 from being rotated at excessively high speeds.

Figure 2:
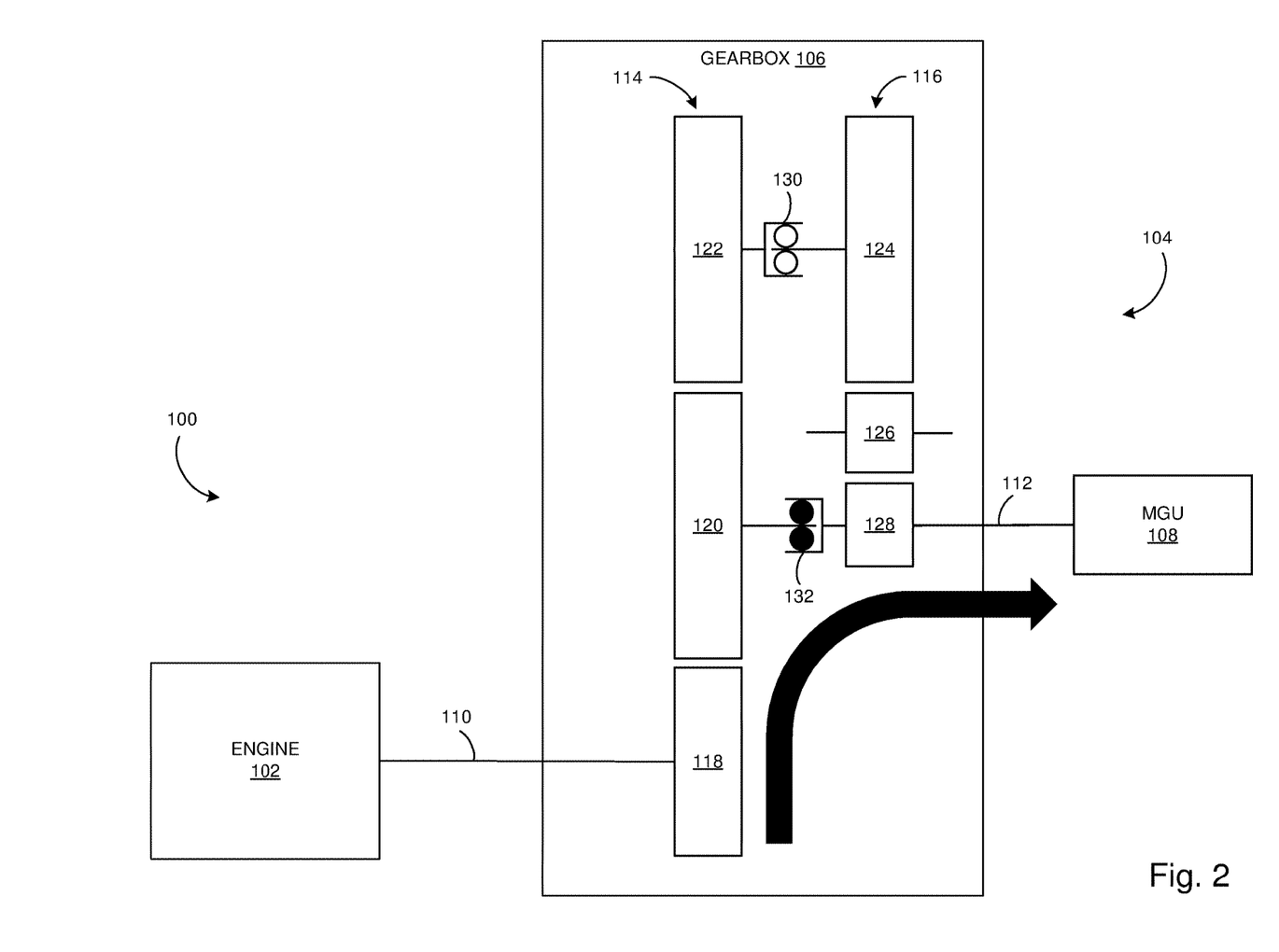
FIG. 2 is a schematic diagram of the vehicle powertrain system of FIG. 1, with the motor generator unit (MGU) operating in a generating mode.

FIG. 2 is a schematic diagram of the vehicle powertrain system 100 of FIG. 1 with the MGU 108 operating in a generating mode. In other words, as depicted in FIG. 2, the engine 102 is driving the MGU 108, such that the MGU 108 is receiving energy from the engine 102. More specifically, torque is transferred from the engine 102 to the first gear 118 via the first shaft 110, from the first gear 118 to the second gear 120, from the second gear 120 to the sixth gear 128 via the engaged second clutch 132, and from the sixth gear 128 to the MGU 108 via the second shaft 112. In operation, when the MGU 108 is operating in the generating mode, the first clutch 130 is disengaged automatically, and the second clutch 132 is engaged automatically. According to an embodiment, the engine 102 is driving the MGU 108 at a first predetermined gear ratio. According to an embodiment, the first predetermined gear ratio is 1:1. In another embodiment, the first predetermined gear ratio is less than 5:1. The second and sixth gears 120, 128 are driven at a 1:1 ratio by way of their engagement to each other via the second clutch 132. The fourth gear 124 is decoupled from the third gear 122, spinning freely (e.g., freewheeling) at a ratio corresponding to the size of the sixth gear 128 relative to the fourth gear 124. During conditions when the engine 102 slows down while the first clutch 130 is disengaged, the second clutch 132 will disengage automatically, thereby reducing the torque transmitted through the second shaft 112. This may occur, for example, during gear changes.

Figure 3:
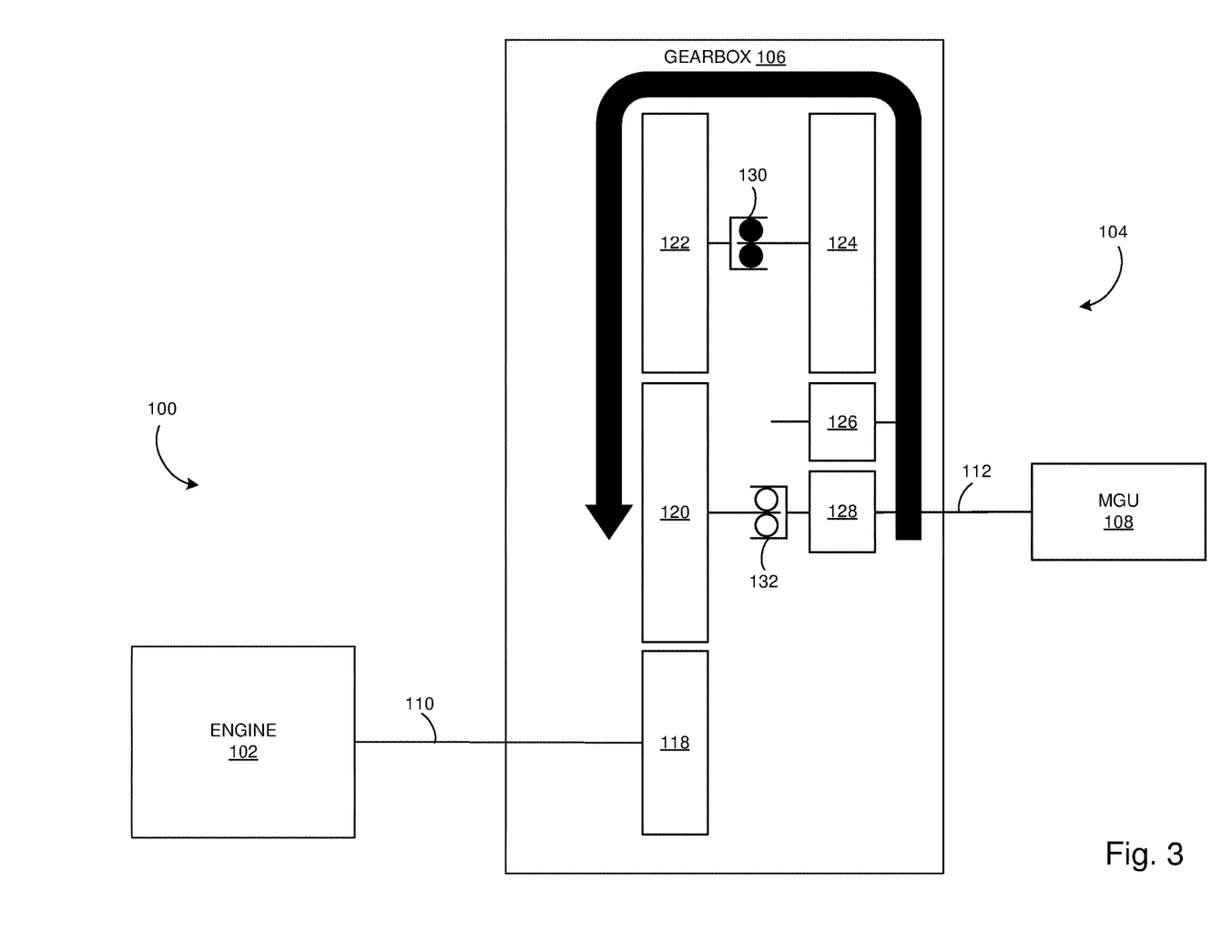
FIG. 3 is a schematic diagram of the vehicle powertrain system of FIG. 1, with the MGU operating in a starting mode.

FIG. 3 is a schematic diagram of the vehicle powertrain system 100 of FIG. 1 with the MGU 108 operating in a starting mode. In other words, as depicted in FIG. 3, the MGU 108 is driving the engine 102 (e.g., providing energy to the engine 102). More specifically, torque is transferred from the MGU 108 to the sixth gear 128 via the second shaft 112, from the sixth gear 128 to the fifth gear 126, from the fifth gear 126 to the fourth gear 124, from the fourth gear 124 to the third gear 122 via the engaged first clutch 130, from the third gear 122 to the second gear 120, from the second gear 120 to the first gear 118, and from the first gear 118 to the engine 102 via the first shaft 110. In operation, when the MGU 108 is operating in the starting mode, the first clutch 130 is engaged automatically, and the second clutch 132 is disengaged automatically. According to an embodiment, the MGU 108 is driving the engine 102 at a second predetermined gear ratio. According to an embodiment, the second predetermined gear ratio is at least 3:1. In another embodiment, the second predetermined gear ratio is at least 5:1. In an embodiment, the third and fourth gears 122, 124 are driven at a 1:1 ratio by way of their engagement to each other via the first clutch 130. The second gear 120 is decoupled from the sixth gear 128, spinning freely (e.g., freewheeling) at a ratio corresponding to the size of the second gear 120 relative to the third gear 122. When the engine 102 starts, the first clutch 130 will disengage automatically because the third gear 122 will begin to rotate faster than the fourth gear 124.

Figure 4:
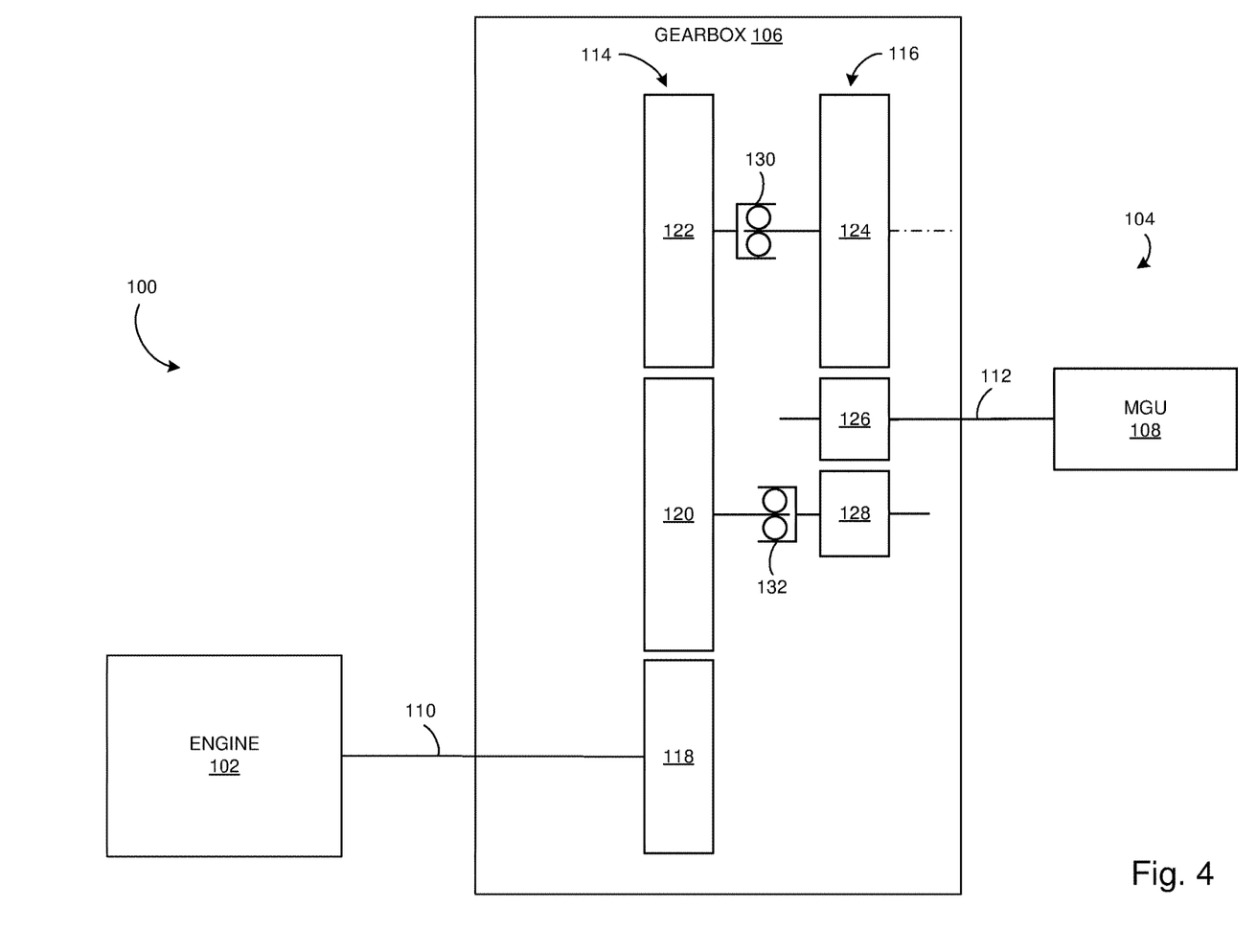
FIG. 4 is a schematic diagram of the vehicle powertrain system of FIG. 1, according to an alternative embodiment.

FIG. 4 is a schematic diagram of the vehicle powertrain system 100 of FIG. 1 according to an alternative embodiment. As illustrated in FIG. 4, the MGU 108 is mounted in a different configuration than in the system of FIG. 1. In particular, the MGU 108 is operatively coupled to the fifth gear 126 rather than to the sixth gear 128. In one embodiment, the fifth and sixth gears 126, 128 are a same size. Accordingly, the system of FIG. 4 and the system of FIG. 1 operate using the same gear ratios, and a difference between system of FIG. 4 and the system of FIG. 1 is the mounting location of the MGU 108 and the direction of rotation of the second shaft 112. Accordingly, the systems of FIGS. 1 and 4 allow the mounting configuration of the MGU 108 to be changed between two different engagement positions.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

As utilized herein, the term "substantially" and any similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided unless otherwise noted. Accordingly, these terms should be interpreted as indicating that insubstantial or inconsequential modifications or alterations of the subject matter described and claimed are considered to be within the scope of the invention as recited in the appended claims. Additionally, it is noted that limitations in the claims should not be interpreted as constituting "means plus function" limitations under the United States patent laws in the event that the term "means" is not used therein.

The terms "coupled" and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

It is important to note that the construction and arrangement of the system shown in the various example implementations is illustrative only and not restrictive in character. All changes and modifications that come within the spirit and/or scope of the described implementations are desired to be protected. It should be understood that some features may not be necessary and implementations lacking the various features may be contemplated as within the scope of the application, the scope being defined by the claims that follow. When the language "at least a portion" and/or "a portion" is used the item can include a portion and/or the entire item unless specifically stated to the contrary.

What is claimed is:

1. A gearbox, comprising:
    a first shaft operatively coupled to an output of an engine, the first shaft having a first longitudinal axis;
    a second shaft operatively coupled to a driveshaft of an electric machine, the second shaft having a second longitudinal axis, the second longitudinal axis being non-coaxial with the first longitudinal axis; and
    a geartrain operatively coupling the first and second shafts, the geartrain structured to passively switch between a first gear ratio and a different second gear ratio;
    wherein the electric machine is selectively mountable to the gearbox in a plurality of mounting locations; and
    wherein the gearbox includes a first engagement point at a first position on the gearbox, and a second engagement point at a second position on the gearbox, wherein the electric machine is selectively mountable to the gearbox at either of the first engagement point or the second engagement point.

2. The gearbox of claim 1, wherein the geartrain is a planar geartrain.

3. The gearbox of claim 1, wherein the geartrain is configured to operate using the first gear ratio when the first shaft is driven by the second shaft, and using the second gear ratio when the second shaft is driven by the first shaft.

4. The gearbox of claim 3, wherein the first gear ratio is higher than the second gear ratio.

5. The gearbox of claim 1, wherein the geartrain is structured to passively switch between the first and second gear ratios based on a direction of torque input to the geartrain.

6. The gearbox of claim 1, wherein the geartrain is structured to passively switch between the first and second gear ratios based on a first rotational speed of the first shaft relative to a second rotational speed of the second shaft.

7. A gearbox, comprising:
    a first shaft operatively coupled to an output of an engine, the first shaft having a first longitudinal axis;
    a second shaft operatively coupled to a driveshaft of an electric machine, the second shaft having a second longitudinal axis, the second longitudinal axis being non-coaxial with the first longitudinal axis;
    a geartrain operatively coupling the first and second shafts, the geartrain structured to passively switch between a first gear ratio and a different second gear ratio;
    a first clutch having a third longitudinal axis; and
    a second clutch having a fourth longitudinal axis, the fourth longitudinal axis being non-coaxial with the third longitudinal axis;
    wherein the electric machine is selectively mountable to the gearbox in a plurality of mounting locations; and
    wherein the gearbox includes a first engagement point at a first position on the gearbox, and a second engagement point at a second position on the gearbox, wherein the electric machine is selectively mountable to the gearbox at either of the first engagement point or the second engagement point.

8. The gearbox of claim 7, wherein the first clutch is an overrunning clutch and the second clutch is an overrunning clutch, the first clutch and the second clutch being alternatively engageable to operate the geartrain in a respective one of the first and second gear ratios.

9. A system, comprising:
an electric machine comprising a driveshaft, the electric machine structured to selectively operate in a starting mode and a generating mode, the starting mode including providing energy, and the generating mode including receiving energy; and
a gearbox, comprising:
a first shaft having a first longitudinal axis;
a second shaft operatively coupled to the driveshaft of the electric machine, the second shaft having a second longitudinal axis, the second longitudinal axis being non-coaxial with the first longitudinal axis;
a geartrain operatively coupling the first and second shafts, the geartrain structured to passively switch between a first gear ratio and a different second gear ratio;
a first clutch having a third longitudinal axis; and
a second clutch having a fourth longitudinal axis, the fourth longitudinal axis being non-coaxial with the third longitudinal axis;
wherein the electric machine is selectively mountable to the gearbox in a plurality of mounting locations; and
wherein the gearbox includes a first engagement point at a first position on the gearbox, and a second engagement point at a second position on the gearbox, wherein the electric machine is selectively mountable to the gearbox at either of the first engagement point and the second engagement point.

10. The system of claim 9, wherein the first clutch is an overrunning clutch and the second clutch is an overrunning clutch, the first clutch and the second clutch being alternatively engageable to operate the geartrain using a respective one of the first and second gear ratios.

11. A system, comprising:
an electric machine comprising a driveshaft, the electric machine structured to selectively operate in a starting mode and a generating mode, the starting mode including providing energy, and the generating mode including receiving energy; and
a gearbox, comprising:
a first shaft having a first longitudinal axis;
a second shaft operatively coupled to the driveshaft of the electric machine, the second shaft having a second longitudinal axis, the second longitudinal axis being non-coaxial with the first longitudinal axis;
a first geartrain, comprising:
a first gear rigidly coupled to the first shaft,
a second gear in meshed engagement with the first gear, and
a third gear in meshed engagement with the second gear;
a second geartrain, comprising:
a fourth gear,
a fifth gear in meshed engagement with the fourth gear,
a sixth gear in meshed engagement with the fifth gear,
a first passive clutch selectively coupling the third and fourth gears, and
a second passive clutch selectively coupling the second and the fifth gears or selectively coupling the second and sixth gears.

12. The system of claim 11,
wherein the second passive clutch selectively couples the second and fifth gears, and the fifth gear is rigidly coupled to the second shaft;
wherein the first passive clutch is engaged so as to couple the third and fourth gears and the second passive clutch is disengaged so as to decouple the second and fifth gears when the electric machine is operating in the starting mode, and
wherein the second passive clutch is engaged so as to couple the second and fifth gears and the first passive clutch is disengaged so as to decouple the third and fourth gears when the electric machine is operating in the generating mode.

13. The system of claim 11,
wherein the second passive clutch selectively couples the second and sixth gears, and the sixth gear is rigidly coupled to the second shaft;
wherein the first passive clutch is engaged so as to couple the third and fourth gears and the second passive clutch is disengaged so as to decouple the second and sixth gears when the electric machine is operating in the starting mode, and wherein the second passive clutch is engaged so as to couple the second and sixth gears and the first passive clutch is disengaged so as to decouple the third and fourth gears when the electric machine is operating in the generating mode.

14. The system of claim 13,
wherein a first gear ratio between the second and sixth gears is at least 3:1, and
wherein a second gear ratio between the third and fourth gears is no higher than 1:1.

15. The system of claim 13, wherein a first gear ratio between the second and sixth gears is at least 5:1.

16. The system of claim 11, wherein the first shaft is operatively coupled to a crankshaft of an engine.

17. A system, comprising:
an electric machine comprising a driveshaft, the electric machine structured to selectively operate in a starting mode and a generating mode, the starting mode including providing energy, and the generating mode including receiving energy; and
a gearbox, comprising:
a first shaft having a first longitudinal axis;
a second shaft operatively coupled to the driveshaft of the electric machine, the second shaft having a second longitudinal axis, the second longitudinal axis being non-coaxial with the first longitudinal axis; and
a geartrain operatively coupling the first and second shafts, the geartrain structured to passively switch between a first gear ratio and a different second gear ratio;
wherein the electric machine is selectively mountable to the gearbox in a plurality of mounting locations; and
wherein the gearbox includes a first engagement point at a first position on the gearbox, and a second engagement point at a second position on the gearbox, wherein the electric machine is selectively mountable to the gearbox at either of the first engagement point and the second engagement point.

18. The system of claim 17, wherein the geartrain is a planar geartrain.

19. The system of claim 17, wherein the geartrain is configured to operate using the first gear ratio when the electric machine is operating in the starting mode, and using the second gear ratio when the electric machine is operating in the generating mode.

20. The system of claim 19, wherein the first gear ratio is higher than the second gear ratio.

21. A system, comprising:
an electric machine comprising a driveshaft, the electric machine structured to selectively operate in a starting mode and a generating mode, the starting mode including providing energy, and the generating mode including receiving energy; and
a gearbox, comprising:
a first shaft having a first longitudinal axis;
a second shaft operatively coupled to the driveshaft of the electric machine, the second shaft having a second longitudinal axis, the second longitudinal axis being non-coaxial with the first longitudinal axis;
a first geartrain, comprising:
a first gear rigidly coupled to the first shaft,
a second gear in meshed engagement with the first gear, and
a third gear in meshed engagement with the second gear;
a second geartrain, comprising:
a fourth gear,
a fifth gear in meshed engagement with the fourth gear, and
a sixth gear in meshed engagement with the fifth gear;
a first clutch selectively coupling the third and fourth gears; and
a second clutch selectively coupling the second and the fifth gears or selectively coupling the second and sixth gears;
wherein the second clutch selectively couples the second and sixth gears, and the sixth gear is rigidly coupled to the second shaft;
wherein the first clutch is engaged so as to couple the third and fourth gears and the second clutch is disengaged so as to decouple the second and sixth gears when the electric machine is operating in the starting mode; and
wherein the second clutch is engaged so as to couple the second and sixth gears and the first clutch is disengaged so as to decouple the third and fourth gears when the electric machine is operating in the generating mode.

22. The system of claim 21,
wherein a first gear ratio between the second and sixth gears is at least 3:1; and
wherein a second gear ratio between the third and fourth gears is no higher than 1:1.

23. The system of claim 21, wherein a first gear ratio between the second and sixth gears is at least 5:1.

* * * * *